(12) United States Patent
Hinc et al.

(10) Patent No.: US 9,102,101 B2
(45) Date of Patent: Aug. 11, 2015

(54) METHOD AND DEVICE FOR MAKING A CONTINUOUS STRIP OF A HIGHLY ADHESIVE PRODUCT PACKAGED IN A THERMOPLASTIC FILM

(75) Inventors: Henri Hinc, Romagnat (FR); Bruno Dussardier, Ennezat (FR); Jacques Rouquet, Chateaugay (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 250 days.

(21) Appl. No.: 13/635,648

(22) PCT Filed: Mar. 4, 2011

(86) PCT No.: PCT/EP2011/053280
§ 371 (c)(1),
(2), (4) Date: Apr. 15, 2013

(87) PCT Pub. No.: WO2011/113712
PCT Pub. Date: Sep. 22, 2011

(65) Prior Publication Data
US 2013/0196108 A1   Aug. 1, 2013

(30) Foreign Application Priority Data
Mar. 15, 2010   (FR) ..................... 10 51835

(51) Int. Cl.
*B29C 47/02*   (2006.01)
*B29C 65/72*   (2006.01)
(Continued)

(52) U.S. Cl.
CPC ............. *B29C 65/72* (2013.01); *B29C 37/0075* (2013.01); *B29C 43/224* (2013.01);
(Continued)

(58) Field of Classification Search
CPC   B29C 37/0075; B29C 43/224; B29C 47/004; B29C 47/0059; B29C 47/0064; B29C 63/065; B29C 63/044; B29D 2030/0694; B29D 2030/0695; B29D 2030/0689; B60C 19/12; B60C 19/122; B60C 19/125; B60C 19/127
USPC ............... 156/224.12, 203, 217, 218, 224.24, 156/224.27
See application file for complete search history.

(56) References Cited

U.S. PATENT DOCUMENTS 1,959,460 A  *   5/1934   Crossan ..................... 156/115
2,141,405 A  *  12/1938   Randall ..................... 425/502
(Continued)

FOREIGN PATENT DOCUMENTS

FR   2 528 350   12/1983
JP   2001-353506   12/2001
(Continued)

*Primary Examiner* — William Bell
(74) *Attorney, Agent, or Firm* — Cozen O'Connor

(57) ABSTRACT

A process for manufacturing a continuous strip of self-sealing product having very low hardness, being very elastic and highly tacky, the strip being intended for feeding a converting machine, during which a thermoplastic protective film is deposited on the surface of the strip. The process includes a step during which a strip of self-sealing product P is extruded to a first cross section ($S_0$) at the outlet of the extrusion die (10). The strip is surrounded over its entire perimeter using a thermoplastic film (20) by welding the film to itself, after having deposited the film (20) around the strip. The strip is calendered in order to bring it down to a second cross section ($S_2$), smaller in area than the first cross section.

16 Claims, 2 Drawing Sheets

(51) Int. Cl.
*B29C 37/00* (2006.01)
*B29C 43/22* (2006.01)
*B29C 47/00* (2006.01)
*B29C 73/18* (2006.01)
*B29C 47/92* (2006.01)
*B60C 19/12* (2006.01)
*B29C 63/04* (2006.01)
*B29C 73/16* (2006.01)
*B29L 30/00* (2006.01)
*B29D 30/06* (2006.01)

(52) U.S. Cl.
CPC .......... *B29C47/0021* (2013.01); *B29C 47/02* (2013.01); *B29C 47/92* (2013.01); *B29C 73/18* (2013.01); *B29C 63/044* (2013.01); *B29C 73/163* (2013.01); *B29D 2030/0694* (2013.01); *B29L 2030/00* (2013.01); *B60C 19/12* (2013.01); *Y10T 156/1007* (2015.01); *Y10T 428/239* (2015.01)

(56) References Cited

U.S. PATENT DOCUMENTS

| | | | |
|---|---|---|---|
| 4,286,643 A * | 9/1981 | Chemizard et al. | 152/505 |
| 4,584,153 A | 4/1986 | Bacon | |
| 4,816,101 A * | 3/1989 | Hong et al. | 156/244.11 |
| 4,925,512 A * | 5/1990 | Briand | 156/201 |
| 8,602,075 B2 | 12/2013 | Albert et al. | |
| 8,609,758 B2 | 12/2013 | Merino-Lopez et al. | |
| 2004/0074579 A1* | 4/2004 | Nakakita et al. | 152/505 |
| 2009/0160078 A1* | 6/2009 | Abad et al. | 264/178 R |
| 2009/0205765 A1* | 8/2009 | Sostmann et al. | 152/502 |
| 2011/0174421 A1 | 7/2011 | Voge et al. | |
| 2012/0115984 A1 | 5/2012 | Pialot et al. | |

FOREIGN PATENT DOCUMENTS

| | | |
|---|---|---|
| WO | WO 2008/080557 A1 | 7/2008 |
| WO | WO 2009/059709 A1 | 5/2009 |
| WO | WO 2010/009849 A1 | 1/2010 |
| WO | WO 2010/009851 A2 | 1/2010 |

\* cited by examiner

METHOD AND DEVICE FOR MAKING A CONTINUOUS STRIP OF A HIGHLY ADHESIVE PRODUCT PACKAGED IN A THERMOPLASTIC FILM

RELATED APPLICATIONS

This is a U.S. National Phase Application under 35 USC 371 of International Application PCT/EP2011/053280 filed on Mar. 4, 2011.

This application claims the priority of French Application No. 10/51835 filed Mar. 15, 2010, the content of which is hereby incorporated by reference.

FIELD OF THE INVENTION

The field of the invention relates to the manufacture and preparation of profiled elements produced using a highly tacky elastomeric product that are used, for example, for forming self-sealing solutions positioned in tires for land vehicles.

BACKGROUND OF THE INVENTION

These materials are also characterized by a very low hardness, an elastic behaviour, that is to say that they regain their initial shape after a deformation, even of large amplitude, and a softening temperature beyond which they become plastic, which facilitates their processing.

By definition, and by convention for clear understanding of the present description, a product is considered to have a very low hardness when, in the crosslinked and finished state, its hardness is less than 10 Shore A measured according to the ASTM D-2240 (1986) standard, is considered to be very elastic when, in the crosslinked and finished state, its elongation at break, measured according to the ASTM D-412 (1998) standard, is greater than 500%, and is considered to be highly tacky when, in the uncrosslinked state, the distance travelled on a ball tack tester is less than 5 cm. The self-sealing solutions possess these three characteristics.

The test for measuring the tackiness using a ball tack tester, the description of which is given in the present description, in reference to FIG. 3, is not the subject of a standardized standard. This measurement consists in measuring the free length L travelled over the surface of the material to be measured by a ball B endowed with a given initial speed. The tack tester is formed by an inclined plane making an angle of 13°+/−0.08° relative to the horizontal plane, covered with a smooth material of the Mylar® type. The calibrated, 100CR6 smooth ball B made of grade 40 steel has a mass of 80.2+/−0.2 g and a diameter of 26.98+/−0.05 mm. The material M to be measured forms a layer of constant thickness. This material is positioned on a horizontal flat surface adjusted using a spirit level, and the inclined plane is placed on the surface of the material to be measured so as to leave a sufficient length of the surface of said material free. The ball, previously cleaned with ethyl alcohol using a dry cloth, is placed on the inclined plane so that the height H between the plane forming the surface of the material to be measured and the horizontal plane tangent to the upper pole of the ball is equal to 63.5+/−0.5 mm. After having been released, the ball picks up momentum over the inclined plane and rolls freely a length L over the flat surface of the product to be measured. The measurement is carried out under ambient temperature Ta and humidity RH conditions (Ta=23° C.+/−2° C., RH=50%+/−10%).

Such products may have, as matrix, thermoplastic elastomers (TPEs) and in particular stirene thermoplastic (TPS) elastomers, such as stirene/butadiene (SB), stirene/isoprene (SI), stirene/isobutylene (SIB), stirene/ethylene/propylene (SEP), stirene/ethylene/butylene (SEB) or else stirene/butadiene/stirene (SBS), stirene/isoprene/stirene (SIS), stirene/butadiene/isoprene/stirene (SBIS), stirene/isobutylene/stirene (SIBS), stirene/ethylene/butylene/stirene (SEBS), stirene/ethylene/propylene/stirene (SEPS), stirene/ethylene/ethylene/propylene/stirene (SEEPS) block copolymers, and mixtures of these copolymers, as described, for example, in applications WO 2008/080557 and WO 2009/059709 which relate to self-sealing compositions that can be used in pneumatic tires.

They may also have, as matrix, diene elastomers, especially selected from the group consisting of polybutadienes, natural rubber, synthetic polyisoprenes, butadiene copolymers, isoprene copolymers and mixtures of these elastomers, as described, for example, in applications WO 2010/009849 and WO 2010/009851 which also relate to self-sealing compositions for pneumatic tires.

In order to obtain a very low hardness, they may comprise extender oils in a high proportion, in particular for the products in which the elastomer matrix is a thermoplastic. In the latter case, the extender oil is introduced in a proportion of 200 phr (per hundred of elastomer by weight) or more.

However, the storage, handling and preparation of these products, with a view to their conversion, comprises specific difficulties. This is because it is necessary to produce intermediate products that are in the form of continuous strips, the cross section of which is suitable for being able to be used as a product incorporated in processing and conversion processes. And it is impossible to produce such strips without particular precautions, at the risk of having to confront all the drawbacks linked to the high tack and to the deformability of these self-sealing products.

The expression "continuous strip" is understood to mean a strip in which the length is several orders of magnitude greater than the ratio between the cross section of the strip and said length. By way of indication, it is considered that a continuous strip is being dealt with when the length of the strip is a hundred times greater than the ratio between the cross section of the strip and its length.

It is known from the prior art to package tacky products in a film that covers the entire surface of the product, in order to avoid the agglomeration of said products with their supports, or with the adjacent products, during the industrial processing phases.

Conventionally, these films are chosen so that their formulation is compatible with the self-sealing product, which exempts the user from the need to remove the film during the conversion of the product. More specifically, it is arranged so that the film melts and mixes completely with the self-sealing product during the use of said product at a temperature generally above the temperature of the film.

A film in a polymer is therefore chosen, the composition of which is compatible with the formulation of the self-sealing products described above. Products are considered to be physically compatible when the glass transition temperature ($Tg_m$) of the mixture has a single maximum. The glass transition temperature is determined by differential scanning calorimetry (or DSC). By denoting as $Tg_p$ the glass transition temperature of the self-sealing product and as $Tg_f$ the glass transition temperature of the film, it is observed that the mixture of the two components has a glass transition temperature $Tg_m$ between $Tg_p$ and $Tg_f$ according to the Fox equation, such that $1/Tg_m = a/Tg_p + (1-a)/Tg_f$ (in which Tg is expressed in Kelvin), and that the glass transition temperatures of the self-sealing product $Tg_p$ and that of the film $Tg_f$ cannot be detected in said mixture.

The packaging films that are particularly well suited to this type of application are films predominantly based on ethylene vinyl acetate (EVA) and more particularly films of this family such as the films predominantly based on polyolefin elastomer (POE) or on polyolefin plastomer (POP).

The problem posed by the use of packaging films of any nature lies in the fact that these materials, when they are present above a certain proportion, substantially modify the properties of the thermoplastic products that they are used to package, such as, for example, the modulus of elasticity or the elongatability. Therefore, particular attention is necessary when it is desired to deposit a protective film on the surface of these materials.

For the products and films considered, the acceptable dilution ratios must be less than 1%, and are, as a general rule, less than 0.5% by volume and, preferably, less than 0.3%.

Therefore, to reduce the dilution ratio, it is sought to reduce the thickness of the films used for the packaging of these self-sealing products as much as possible.

To satisfy this requirement and to be free of the difficulties linked, on the one hand, to the non-availability of films of very small thickness on the market and, on the other hand, to the difficulty of using films of very small thickness that have a very low mechanical strength, one solution consists in adapting the cross section of the continuous strip so that the volume ratio between the sealing product and the film remains contained within the acceptable ratios defined above.

It results therefrom that the ratio between the cross section of the strip and its circumference must be greater than a given magnitude, proportional to the thickness of the strip. Thus, for a given film thickness, the more it is sought to reduce the dilution ratio, the more the cross section of the strip will have to be increased. In practice, it is arranged so that the ratio between the cross section of the strip and its perimeter is greater than or equal to 100 times the thickness of the film, and preferably greater than or equal to 330 times the thickness of the film.

This situation has the effect, for a given film thickness, of imposing the cross section of the strip of self-sealing product. It is nevertheless observed that this technical choice may pose problems of control of the thermodynamics during the extrusion of these strips, but may also render the strip difficult to use in downstream conversion processes due to its excessively large size.

SUMMARY OF THE INVENTION

One object of the invention is to propose a process and a device that are suitable for solving the problem addressed above.

According to one aspect of the invention, the process for manufacturing a continuous strip of elastomer-based self-sealing product, said strip being intended for feeding a converting machine, and during which a thermoplastic protective film is deposited on the surface of the strip, comprises the steps during which:

a strip of self-sealing product is extruded to a first cross section, at the outlet of the extrusion die the strip is surrounded over its entire perimeter using a thermoplastic film by welding the film to itself.

This process is characterized in that, after having deposited the film around the strip, the strip is calendered in order to bring it down to a second cross section smaller than the first cross section.

By proceeding in this way, preferably while the strip is still hot, it is possible to adjust the cross section of the strip at the extrusion die in order to have the desired dilution ratio, and the cross section of the strip is brought down to the cross section that enables a more homogeneous cooling of the core of the strip and that corresponds to the cross section imposed by the feed means of the converting device that the strip is intended to be fed to.

Another aspect of the invention provides an extrusion and packaging device capable of implementing the process according to an embodiment of the invention. This device, intended for the production of a continuous strip of a self-sealing product, comprises an extrusion die of given cross section S0, and a film application means capable of depositing a film around the perimeter of said strip.

This device is characterized in that, positioned downstream of the film application means are one or more sets of rolls, each set comprising at least two rolls forming a nip, and the axes of which are positioned in one and the same plane and define a closed cross section ($S_1$, $S_2$,), inside which the strip is intended to travel, said rolls being placed so that said cross section has an area smaller than the cross section of the die, and smaller than the cross section of the set of rolls placed immediately upstream in the direction of travel of the strip.

This device, which does not adversely affect the dilution ratio of the film in the self-sealing material, makes it possible to reduce the cross section of the strip from a first cross section corresponding to the cross section of the extrusion die, to a second cross section corresponding to the cross section of the converting means.

BRIEF DESCRIPTION OF THE DRAWINGS

The description which follows will enable the invention to be better understood, and draws on FIGS. 1 to 3, in which.

DETAILED DESCRIPTION OF THE DRAWINGS

Figure 1:
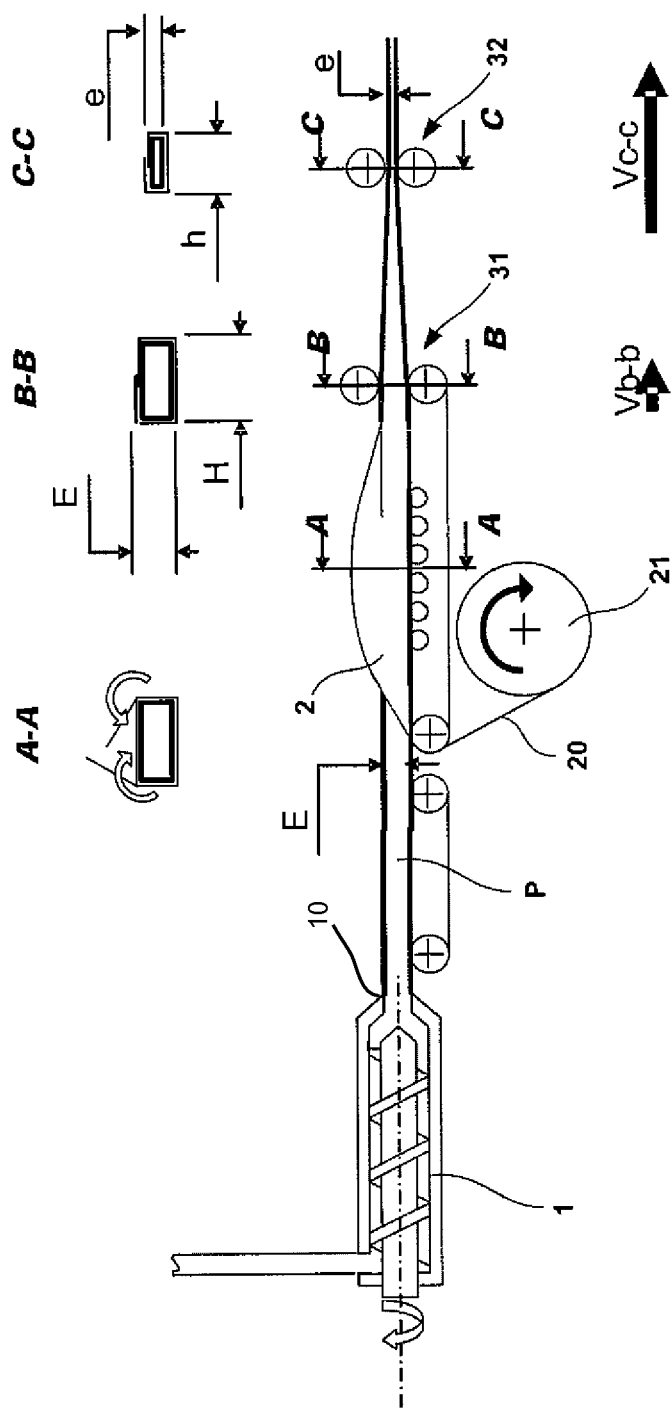
FIG. 1 represents a device in accordance with an embodiment of the invention.

The extrusion and packaging device depicted in FIG. 1 comprises an extrusion means 1 opening into an extrusion die 10, through which the self-sealing product P flows. The cross section $S_0$ of the product P exiting corresponds to the cross section of the die 10 and corresponds to said first cross section.

Film application means 2 are positioned downstream of the extrusion means. The thermoplastic film 20 is unwound from a storage means 21 and wound continuously over the entire perimeter of the strip of self-sealing product, as is illustrated in view AA.

The complete packaging is achieved by covering a portion of the film upon itself. At this stage, it may prove particularly advantageous to choose a film having a melting point that is below the temperature of the self-sealing product exiting the die at the moment when the film is packaged around the strip. In this way, the welding of the film to itself is carried out without the need to use any particular means, by simple overlapping of the two longitudinal lips of the film. In practice, a film having a melting point that is below 110° C. and preferably below 80° C. will be chosen. A melting point between 60° C. and 90° C. would appear to correspond to the range of extrusion die outlet temperatures of the strip of self-sealing product that are most commonly observed.

Once the film is deposited on the strip of self-sealing product, it is possible to carry out the phase of calendering and reducing the cross section of the strip in order to adapt it to the feed conditions of the converting devices for which the strip is intended.

Figure 2:
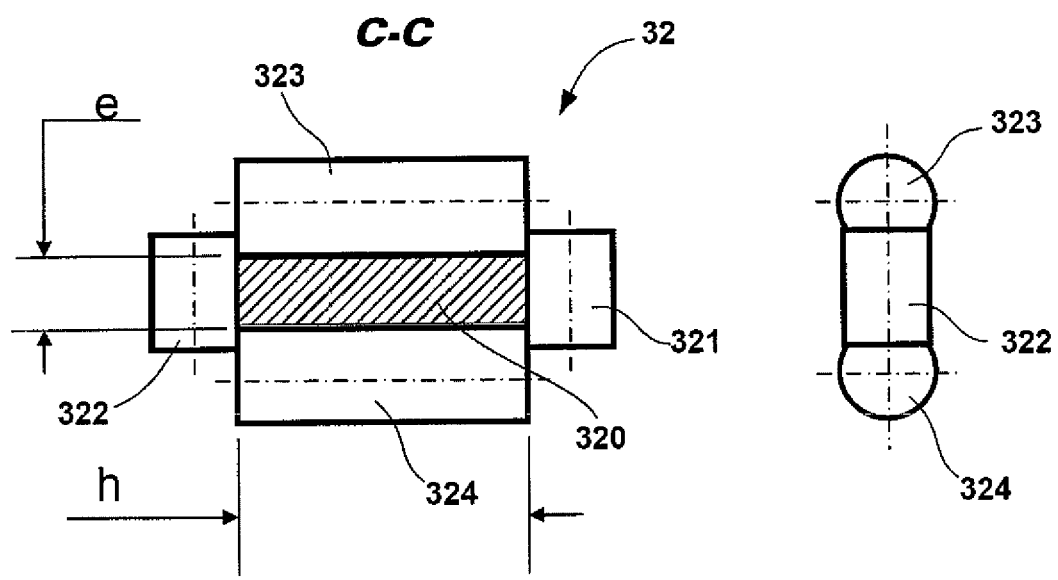
FIG. 2 represents a set of rolls in accordance with an embodiment of the invention.
Figure 3:
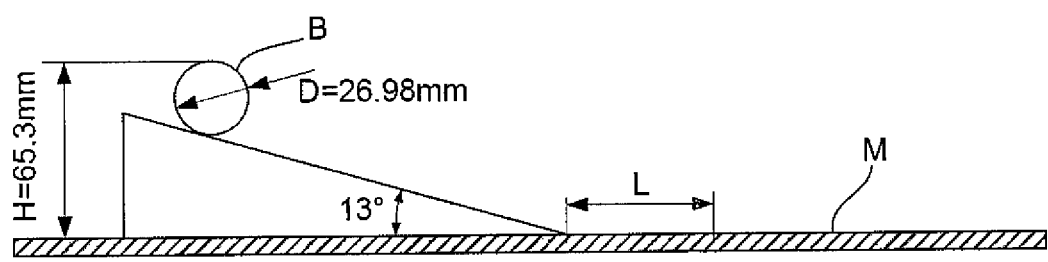
FIG. 3 represents a schematic view of a ball tack tester.

The cross section of the strip is reduced with the aid of one or more sets of rolls 31, 32. The axes of the rolls of one and the same set are placed in one and the same plane and the rolls define a nip 320, as illustrated in FIG. 2, inside which the strip of self-sealing product covered with its protective film 20 travels.

The number of rolls included in a set depends on the final shape that it is desired to give the strip of self-sealing product. A set of two rolls makes it possible to carry out the calendering by crushing the strip but necessitates positioning, immediately downstream of this set, a set of two other rolls, the axes of which are oriented in a different direction in order to obtain the desired effect, namely the reduction of the cross section of the strip.

Preferably, the most suitable embodiment consists in using four rolls (321, 322, 323, 324) of substantially cylindrical shape per set. The rolls 321, 322, 323, 324 have axes belonging to the same plane, the axes of the rolls 324 and 323 and the axes of the rolls 321 and 322 are respectively parallel to one another, and perpendicular from one pair to the next. They define a nip 320 of closed rectangular cross section, corresponding to the hatched zone of FIG. 2. It is then arranged so that the cross section of this nip $S_1$ is smaller than the cross section of the strip at the outlet of the die.

With a set comprising two, three or four rolls or a plurality of rolls, and by modifying the shape and the concavity of the generatrices of the rolls, it is also possible to produce a strip of substantially circular cross section having an optimal compactness. And, in order to obtain a strip where the cross section has a given profile, a person skilled in the art will have no trouble determining the number and the optimal shape of the rolls defining the nip.

By arranging in this way one or more sets of rolls, the cross section of which decreases in the direction of travel of the strip, the cross section of the strip is gradually decreased until the second desired cross section is obtained. The first set of rolls 31 defines a rectangular cross section $S_1$ equal to E×H, and the set of rolls 32, located downstream of the set 31, defines a rectangular cross section $S_2$ equal to e×h that is smaller than $S_1$.

Preferably, the operation for calendering and reducing the cross section of the strip of self-sealing product is carried out hot in order to take advantage of the plastic properties of the self-sealing material at these temperatures, but also to allow the extension of the thermoplastic film. In other words, arrangements are made in order to choose a thermoplastic film having a softening point that is below the temperature of the self-sealing product after the strip has been brought down to said second cross section. In practice, a film having a VICAT softening point between 40° C. and 60° C. will be chosen.

The motorization of the calendering rolls will be adapted so as to change the circumferential speed of the rolls, corresponding to the run speed of the strip (Vb-b, Vc-c), as a function of the decrease in the cross section of the strip, which speed increases in inverse proportion to the variation of the cross section.

After having brought the strip down to said second cross section ($S_2$), the strip is cooled to ambient temperature.

The invention claimed is:

1. A process for manufacturing a continuous strip of self-sealing product having very low hardness, being very elastic and highly tacky, said strip being intended for feeding a converting machine, during which a thermoplastic protective film is deposited on the surface of the strip, and comprising the steps during which:
   a strip of self-sealing product P is extruded to a first cross section through an extrusion die,
   at the outlet of the extrusion die, the strip is surrounded over its entire perimeter using a thermoplastic film by welding the film to itself, and
   wherein, after having deposited the film around the strip, the strip is calendered in order to bring it down to a second cross section, smaller in area than the first cross section.

2. The process according to claim 1, wherein, during the calendering step, the strip of self-sealing product has a temperature above the softening point of the film.

3. The process according to claim 1, wherein the first cross section of the strip is defined so that the ratio between the cross section of the strip and its perimeter is greater than or equal to 100 times the thickness of the film.

4. The process according to claim 1, wherein a thermoplastic film having a melting point below 110° C. is chosen, and wherein, during the film application step, the self-sealing product has a temperature above the melting point of the protective film.

5. The process according to claim 4, wherein the welding of the film to itself is carried out by bringing the film into contact with the self-sealing product.

6. The process according to claim 1, wherein, after having brought the strip down to said second cross section, the strip is cooled to ambient temperature.

7. The process according to claim 1, wherein the self-sealing product comprises, as predominant elastomer, a styrene thermoplastic elastomer chosen from elastomers comprising:
   styrene/butadiene,
   styrene/isoprene,
   styrene/isobutylene,
   styrene/ethylene/propylene,
   styrene/ethylene/butylene,
   styrene/butadiene/ styrene,
   styrene/isoprene/ styrene,
   styrene/butadiene/isoprene/ styrene,
   styrene/isobutylene/ styrene,
   styrene/ethylene/butylene/styrene,
   styrene/ethylene/propylene/styrene,
   styrene/ethylene/ethylene/propylene/styrene
   and mixtures of these copolymers.

8. The process according to claim 1, wherein the self-sealing product comprises, as predominant elastomer, a diene elastomer chosen from elastomers comprising:
   polybutadiene,
   natural rubber,
   synthetic polyisoprenes,
   butadiene copolymers,
   isoprene copolymers,
   and mixtures of these elastomers.

9. The process according to claim 1, wherein the packaging film is predominantly based on ethylene vinyl acetate.

10. The process according to claim 1, wherein the film is predominantly based on polyolefin elastomer.

11. The process according to claim 1, wherein the first cross section of the strip is defined so that the ratio between the cross section of the strip and its perimeter is greater than or equal to 330 times the thickness of the film.

12. The process according to claim 1, wherein a thermoplastic film having a melting point below 80° C. is chosen, and wherein, during the film application step, the self-sealing product has a temperature above the melting point of the protective film.

13. An extrusion and packaging device for the production of a continuous strip of a self-sealing product, comprising an extrusion die of given cross section, a film application means capable of depositing a film around the perimeter of said strip, wherein, positioned downstream of the film application means are one or more sets of rolls, each set comprising at least two rolls forming a nip and the axes of which are positioned in one and the same plane and define a closed cross section, inside which the strip is intended to travel, said rolls being placed so that said cross section has an area smaller than the cross section of the die, and smaller than the cross section of the set of rolls placed immediately upstream in the direction of travel of the strip, wherein the device comprises at least one set of rolls formed of four rolls, positioned so that the nip defined by the set of rolls has a rectangular cross section.

14. The device according to claim 13, comprising roll motorization means, the circumferential speed of which rolls is adapted so that the run speed increases proportionally relative to the decrease in the cross section of the strip.

15. An extrusion and packaging device for the production of a continuous strip of a self-sealing product, comprising an extrusion die of given cross section, a film application means capable of depositing a film around the perimeter of said strip, wherein, positioned downstream of the film application means are one or more sets of rolls, each set comprising at least two rolls forming a nip and the axes of which are positioned in one and the same plane and define a closed cross section, inside which the strip is intended to travel, said rolls being placed so that said cross section has an area smaller than the cross section of the die, and smaller than the cross section of the set of rolls placed immediately upstream in the direction of travel of the strip, wherein the device comprises at least one set of rolls formed of a multiplicity of rolls, positioned so that the nip defined by the set of rolls has a substantially circular cross section.

16. The device according to claim 15, comprising roll motorization means, the circumferential speed of which rolls is adapted so that the run speed increases proportionally relative to the decrease in the cross section of the strip.

\* \* \* \* \*